Jan. 22, 1957  M. N. FAIRBANK  2,778,734
PHOTOGRAPHIC APPARATUS AND PHOTOGRAPHIC
PRODUCT USABLE THEREWITH
Filed Nov. 3, 1951  2 Sheets-Sheet 1

INVENTOR
Murry N. Fairbank

BY Brown and Mikulka
ATTORNEYS

Jan. 22, 1957   M. N. FAIRBANK   2,778,734
PHOTOGRAPHIC APPARATUS AND PHOTOGRAPHIC
PRODUCT USABLE THEREWITH
Filed Nov. 3, 1951   2 Sheets-Sheet 2

INVENTOR
Murry N. Fairbank
BY Brown and Mikulka
ATTORNEYS

United States Patent Office 2,778,734
Patented Jan. 22, 1957

2,778,734

PHOTOGRAPHIC APPARATUS AND PHOTOGRAPHIC PRODUCT USABLE THEREWITH

Murry N. Fairbank, Belmont, Mass., assignor to Polaroid Corporation, Cambridge, Mass., a corporation of Delaware Application November 3, 1951, Serial No. 254,677

8 Claims. (Cl. 96—29)

This invention relates to photography and more particularly to photographic apparatus and a photographic product usable therewith.

An object of the present invention is to provide a photographic apparatus which is particularly adapted for successively exposing a large number of frames of a first photo-sensitive film and for processing said frames by superposing said first film on a second film and by spreading a processing composition between said films.

Another object of the present invention is to provide novel means for feeding said processing composition to portions of first and second films that are about to be superposed, said feeding being responsive to the need for said processing composition.

Still another object of the present invention is to provide novel electrical means for controlling the feeding of liquid to a pair of films that are being superposed with a thin layer of said liquid therebetween.

A further object of the present invention is to provide a film which, when superposed on another film with a thin layer of processing composition spread between said films, enables the making and breaking of electrical connection between at least a portion of said thin layer of processing composition and at least a terminal of the aforementioned electrical means.

A still further object of the present invention is to provide a photographic product comprising a pair of films of the above type, one of said films being provided with a row of slots along at least an edge thereof.

Other objects of the invention will in part be obvious and will in part appear hereinafter.

The invention accordingly comprises the product possessing the features, properties and the relation of components, and the apparatus possessing the construction, combination of elements and arrangement of parts, which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figures 1, 2, 3:
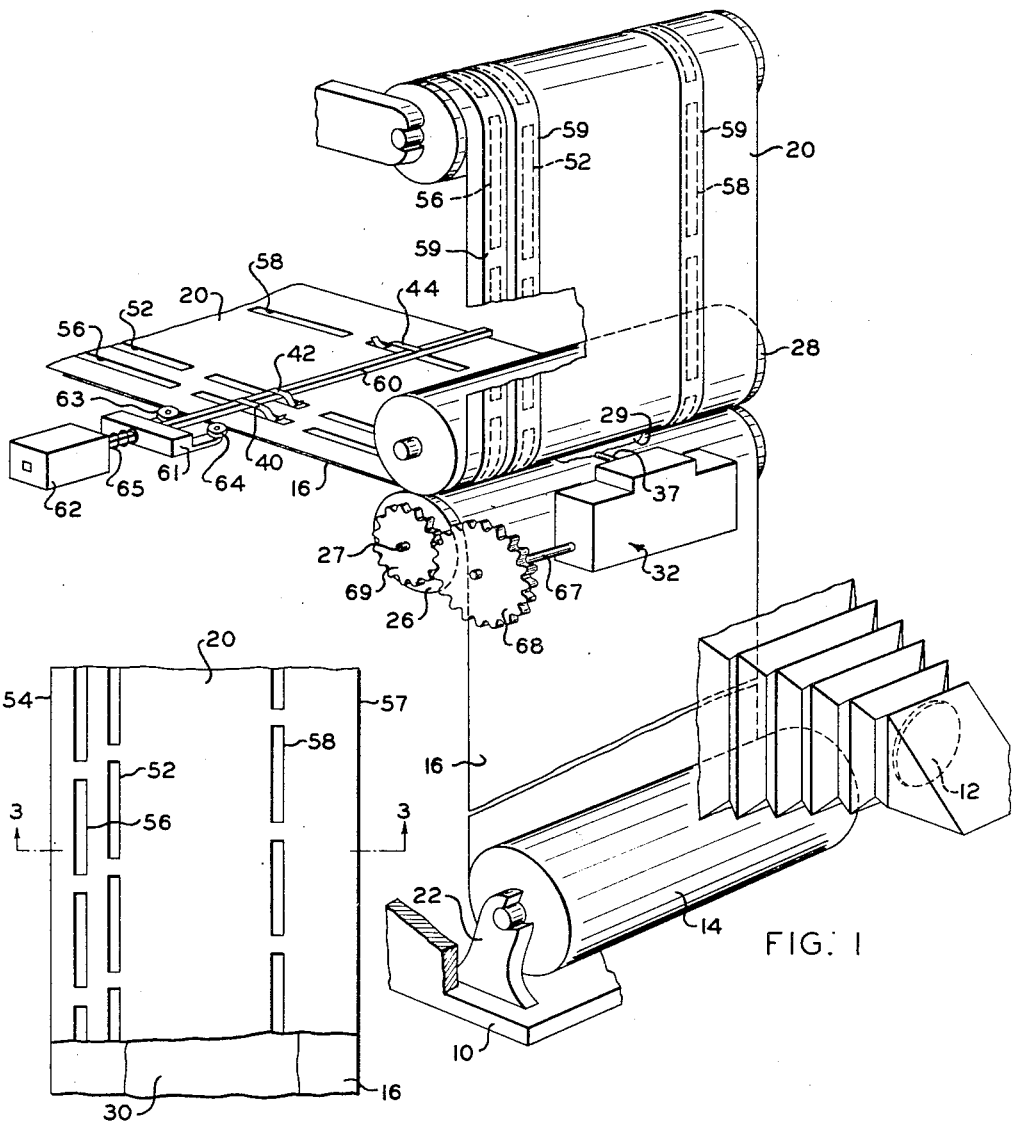
Figure 1 is a diagrammatic, fragmentary, exaggerated, perspective view of a preferred embodiment of the present invention.
Fig. 2 is an exaggerated, fragmentary plan view of superposed portions of the films shown in Fig. 1.
Fig. 3 is an exaggerated, cross-sectional view of the superposed portions of the films of Fig. 1 taken substantially along the line 3—3 of Fig. 2.

By way of introduction, the photographic apparatus herein disclosed comprises means for holding a first film of photosensitive material, said first film preferably comprising a base and a silver halide layer, means for exposing a frame of said first film and means for processing said frame within the apparatus, the processing being accomplished by the spreading of a processing composition between said frame and a second film, also positioned within the apparatus. The second film, by way of example, comprises a base and a silver precipitating layer, one species of which includes nuclei of the group consisting of the heavy metal sulfides and the heavy metal selenides. The processing composition may comprise a developer, a silver halide solvent, an alkali and a viscosity-increasing, film-forming material such as an alkali-inert polymer. The exposed surface of the first film and a surface of the second film are provided with a supply of processing composition and the first and second films then are passed between a pair of pressure-applying members to cause superposition of the first and second films and spreading of a thin layer of processing composition therebetween. The result of this procedure is to develop the latent image in a frame of the first film to silver and to form in said frame a soluble silver complex from unexposed silver halide for transfer to said second film. This complex, at least in part, may be transferred, by inhibition, to a frame of the second film where it may be developed to silver to provide a positive image.

The photographic apparatus and various species of the first and second films herein referred to are described in detail in the following patent, patent applications and publications: Patent No. 2,543,181, issued to Edwin H. Land on February 27, 1951, for Photographic Product Comprising a Rupturable Container Carrying a Photographic Processing Liquid; application Serial No. 727,385, filed by Edwin H. Land on February 8, 1947, for Photographic Product and Process (now Patent No. 2,698,245, issued December 28, 1954); application Serial No. 7,795, filed by Edwin H. Land on February 12, 1948, for Photographic Process (now Patent No. 2,647,056, issued July 28, 1953); application Serial No. 164,908, filed by Edwin H. Land on May 29, 1950, for Photographic Silver Halide Transfer Product and Process (now abandoned and replaced by application Serial No. 449,995, filed August 16, 1954, and issued as Patent No. 2,698,237 on December 28, 1954); and the article by Edwin H. Land, "A New One-Step Photographic Process," published in February 1947 in the Journal of the Optical Society of America, vol. 37, No. 2, pp. 61–77. It is, of course, to be understood that the present invention is not limited to use with first or second films embodying any particular species of chemical composition, the terms "first film" and "second film" being used in their broadest sense to indicate a first film which is photosensitive and a second film which merely may aid in spreading the processing liquid over the surface of the first film or which may, if desired, possess other characteristics.

For the purpose of clarity, the present disclosure omits a description and detailed drawings of some of the photographic structure which may be used in conjunction with the illustrated embodiments of the herein disclosed invention. Said structure is known to persons skilled in the art and a review thereof is not needed for an understanding of the present invention. Examples of said structure appear in Patent No. 2,435,717, issued to Edwin H. Land on February 10, 1948, for Developing Camera Utilizing a Film, Another Sheet Material, and a Fluid Processing Agent, and Patent No. 2,520,641, issued to Edwin H. Land on August 29, 1950, for Photographic Apparatus.

Fig. 1 shows a fragmentary, diagrammatic, perspective view of a photocopy camera which embodies the herein disclosed invention. Generally, the camera of Fig. 1 is provided with a pair of pressure-applying members of the kind previously referred to. These pressure-applying members provide a pressure region between their adjacent surfaces, which pressure region is adapted to movably receive first and second films in superposed relation and to spread between said films a thin layer of processing composition. In operation, said first and second films are adapted to be drawn between said pressure-applying members, portions of said first and second films which are approaching closely to said pressure region being adapted to support a mass of processing composition from which the processing composition forming the thin layer between said films is supplied. A feed means is provided for ejecting processing composition from a container into said mass of processing composition. An electrical circuit, including a plurality of brushes positioned adjacent at least an edge of said first and second films, is provided to control the flow of processing composition from said feed means. The processing composition is electrically conducting. The thin layer of processing composition between the first and second films, by making and breaking electrical contact with the aforementioned brushes, controls the flow of processing composition from the feed means.

The embodiment of the herein disclosed invention shown in Fig. 1 comprises a suitable housing 10 which mounts a lens, shutter assembly and bellows schematically indicated at 12. A supply of first film 16, such as roll 14, is suitably mounted within housing 10. First film 16 is provided with a layer of photosensitive material, for example a silver halide emulsion, and is adapted to be positioned by suitable guide surfaces (not shown) and exposed in the focal surface of lens 12. Also mounted within the housing 10 is a supply of second film 20, such as roll 18. Second film 20 may comprise a silver precipitating layer having precipitating nuclei from the group consisting of the heavy metal sulfides and the heavy metal selenides and is adapted to receive a visible positive image which corresponds to the latent image formed by exposure of first film 16. Roll 14 may be rotatably mounted on such means as brackets 22 and roll 18 may be rotatably mounted on such means as brackets 24, one bracket 22 and one bracket 24 being shown in Fig. 1.

In accordance with the present invention, the camera of Fig. 1 is provided with a pair of pressure-applying members for superposing first and second films 16, 20 and for spreading a thin layer of processing composition between said films. As shown, the pressure-applying members comprise a pair of rollers 26 and 28 rotatably mounted within housing 10. Adjacent surfaces of pressure-applying members 26, 28 are spaced apart a distance slightly greater than the combined thickness of the first and second films to provide a pressure region, having a V-shaped entrance, in which region portions of first and second films 16, 20 may be superposed with a thin layer of processing composition therebetween. In practice, first film 16 extends from roll 14 into the focal surface of lens 12 and into the V-shaped entrance to the pressure region between pressure-applying members 26, 28. Second film 20 extends from roll 18 and into the V-shaped entrance. First and second films 16, 20 thence converge into the pressure region. Portions of first and second films 16, 20 which are positioned in the V-shaped entrance or, otherwise stated, which are approaching closely to the pressure region, are adapted to hold a mass 29 of processing composition 30 from which is supplied the processing composition in the thin layer being spread between superposed portions of films 16, 20. Films 16, 20 may be drawn manually or mechanically between rollers 26, 28. Alternatively, rollers 26, 28 may be rotated to drive films 16, 20 therebetween. Rotation of rollers 26, 28 may be accomplished by such means as a hand crank or motor. It is expressly to be understood that the pressure-applying members may comprise elements other than rollers. For example, both of the pressure-applying members may comprise suitably shaped plates or, alternatively, one of the pressure-applying members may comprise a plate and the other a roller.

Figure 4:
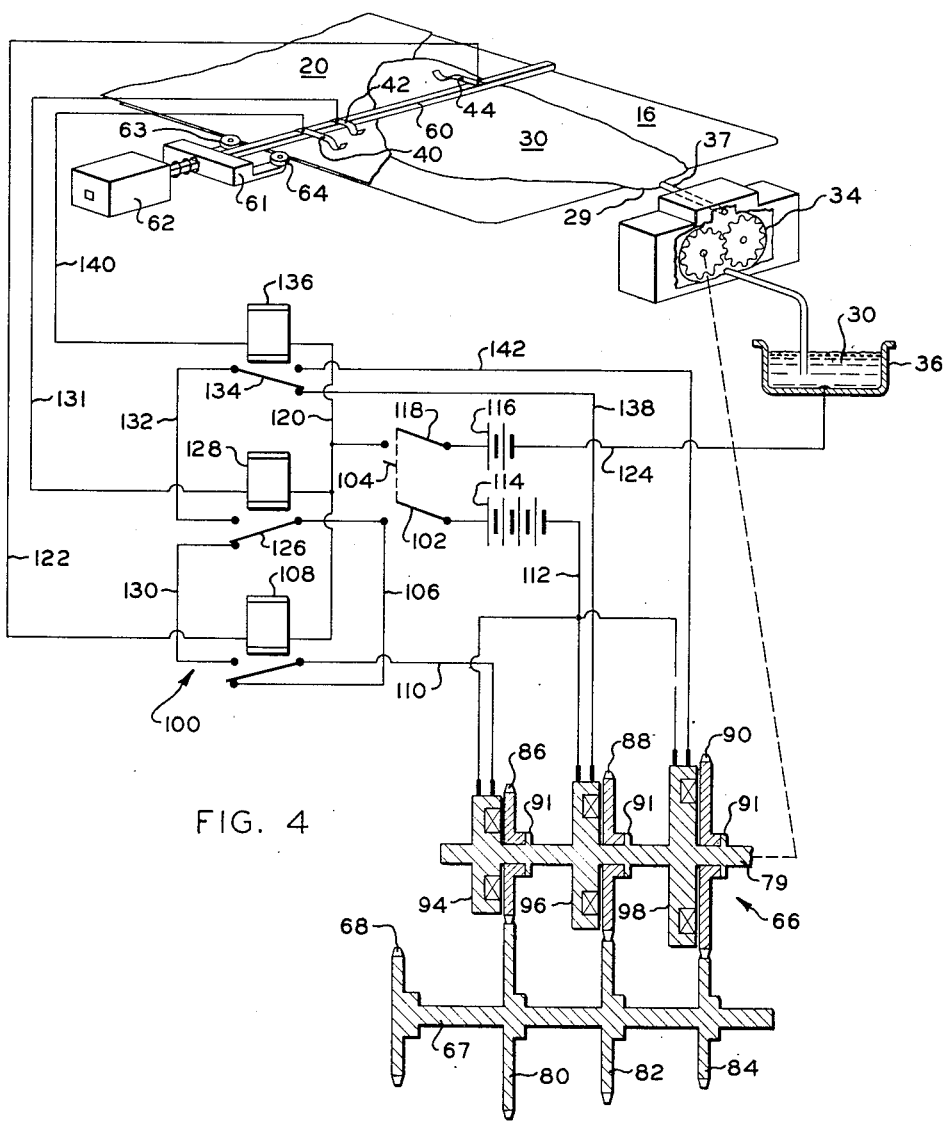
Fig. 4 illustrates schematically the operation and construction of the aforementioned means for controlling the feeding of the processing composition to portions of said first and second films that are about to be superposed.

Feed means are provided for supplying processing composition to the V-shaped entrance in order to form the aforementioned mass 29 of processing composition 30. In the illustrated embodiment, the feed means is mounted in a casing 32 (Fig. 1). The preferred feed means is illustrated in Fig. 4 at 34 as comprising a gear pump which is adapted to draw processing composition 30 from a container 36 and to eject it through a nozzle 37 onto portions of first and second films 16, 20 to form mass 29. Pump or feed means 34, as shown, has electrically conducting inner walls for a reason later to become apparent.

In accordance with the present invention, control means are provided for electrically regulating the flow of processing composition through the feed means in order to assure an adequate supply of processing composition for continuous development of a plurality of latent images and to prevent an oversupply of processing composition and possible consequent leakage into portions of the camera where the presence of processing composition is not desired. In the illustrated embodiment, this control means includes a plurality of brushes 40, 42 and 44 which are adapted to ride along edges of that portion of second film 20 which has been drawn between pressure-applying members 26, 28. Brushes 40, 42 and 44 are adapted to make electrical contact with portions of the thin film of processing composition which has been formed between said second film 20 and the first film 16.

Second film 20 is so constituted as to enable the making of an electrical connection between any of brushes 40, 42 and 44 and portions of the thin film of processing composition which has been formed between first and second films 16, 20. In the form shown, second film 20 is provided with three rows of slots that extend therethrough and that are positioned between the borders of the image-receiving frames of film 20 and the edges of film 20. Row 52 is farther from edge 54 than is row 56 and the distance between row 58 and edge 57 is greater than is the distance from edge 54 to either row 52 or row 56. For the purpose of clarity of illustration, the distances of rows 52 and 56 from edge 54 and of row 58 from edge 57 have been exaggerated in the drawings. Brushes 40, 42 and 44 are positioned to ride along rows of slots 56, 52 and 58, respectively. As films 16, 20 pass between pressure-applying members 26, 28, processing composition 30 from mass 29 spreads toward the edges of superposed portions of films 16, 20 and appears in one or more of the slots in rows 56, 52 and 58. When processing composition 30 is present in at least one of the slots in rows 56, 52 and 58 and comes in contact with at least one of brushes 40, 42, 44, the aforementioned control means is actuated to vary the magnitude of the flow of processing composition 30 through pump 34. Thus, the magnitude of the flow of processing composition through pump 34 is made to depend on the proximity of the boundary of the thin layer of processing composition to the edges of superposed films 16, 20.

In order to prevent processing composition from being forced entirely through the slots, thin permeable absorbent masks 59 may be laminated along each edge of second film 20 on its image-forming side in order to cover the rows of slots 56, 52 and 58. By way of example, such a mask may be composed of a thin permeable tissue or gauze. Masks 59 absorb a sufficient quantity of processing composition to provide electrical connections between the thin film of processing composition and any of the brushes 40, 42 and 44, but prevent escape of processing composition over the upper surface of second film 20 and the possible disruption of the normal operation of brushes 40, 42 and 44.

It is to be understood that either one or both of the first and second films may be provided with a row or rows of slots of the type herein disclosed. It is apparent that any of these rows of slots may be provided with a thin, permeable absorbent mask of the aforementioned type. For example, first film 16 may be provided with slots similar to those shown in Fig. 2 and brushes 40, 42 and 44 may be arranged to ride along opposite edges of first film 16.

Preferably, means are provided to assure registration of brushes 40, 42 and 44 with rows of slots 56, 52 and 58, respectively, at fixed distances from the edges of film 16. Brushes 40, 42 and 44, preferably, are mounted on a movable member whose position is piloted by a guide which follows an edge of the superposed portions of films 16, 20. Thus, the brushes may be mounted, as shown, on a rod 60 which extends through a carriage 61 and a mounting sleeve 62. Mounting sleeve 62 may be suitably secured to housing 10. Carriage 61 may be provided with sheaves 63 and 64 that are adapted to ride along an edge of superposed portions of films 16, 20. A helical spring 65, one end of which presses against mounting sleeve 62 and the other end of which presses against carriage 61, urges carriage 61 toward said edge.

Preferably, the flow of processing composition through pump 34 is synchronized with the movement of superposed portions of films 16, 20 between pressure-applying members 26, 28. By way of example, pump 34 may be driven by roller 26 through such means as a transmission 66. Transmission 66 comprises an input shaft 67 to which is keyed or otherwise secured a spur or friction gear 68. Keyed or otherwise secured to roller 26 and rotatable therewith is a spur or friction gear 69 which normally is in mesh with gear 68. It is apparent that the output speed of transmission 66 is related to the rotational speed of rollers 26.

Transmission 66 is of the constant mesh type and comprises an output shaft 79 which is operatively connected by suitable means (not shown) to pump 34. Secured to shaft 67 of transmission 66 are gears 80, 82 and 84. Mounted for rotation about shaft 79 and independently rotatable with respect thereto are gears 86, 88 and 90 which are in constant mesh with gears 80, 82 and 84, respectively. The magnetic clutches 94, 96 and 98 are secured to shaft 79 and operate to lock gears 86, 88 and 90, respectively to said shaft 79. Such means as stops 91, secured to shaft 79, are provided to prevent appreciable separation of gears 86, 88 and 90 from clutches 94, 96 and 98, respectively. A given input speed of shaft 67 may result in relatively high, intermediate and low speeds of shaft 79, depending on which of clutches 94, 96, 98 is energized at a given time. Since shaft 79 is operatively connected to pump 34, the magnitude of the flow of processing composition through pump 34 also is determined by which of clutches 94, 96, 98 is energized at a given time.

The aforementioned control means for regulating the flow of processing composition through pump 34, as shown, comprises a switching circuit, generally designated by 100, which is adapted to energize only one of magnetic clutches 94, 96, 98 at a give time. Circuit 100 includes brushes 40, 42 and 44 and is responsive to the proximity of the aforementioned thin layer of processing composition to the edges of superposed portions of films 16, 20. Forming a part of circuit 100 is the electrical path which includes processing composition 30 in container 36, the conducting walls of gear pump 34, processing composition 30 extending through said gear pump, mass 29, and the aforementioned thin layer of processing composition which extends from mass 29 toward brushes 40, 42 and 44.

Circuit 100 includes start means for initially energizing clutch 94 in order to produce an initially high rotational speed of shaft 79. In the form shown, said start means comprises the blade 102 of a manually operable double pole-double throw switch 104. Blade 102 is an element in a power loop which additionally includes the lead 106, the blade of a switch 108, a lead 110, magnetic clutch 94, a lead 112 and a power supply 114. When switch 104 has been thrown to operative position, clutch 94 is energized to lock gear 86 to shaft 79 and to cause shaft 79 to rotate at high speed.

Means for initiating fully automatic operation of circuit 100 is provided whereby the rotational speed of shaft 79 is rendered responsive to electrical connections made between any of the brushes 40, 42, 44 and the thin layer of processing composition between superposed portions of films 16, 20. Said means, in the form shown, comprises a control loop which includes a power supply 116, a blade 118 of switch 104, a lead 120, the solenoid of switch 108, a lead 122, processing composition extending from brush 44 through pump 34 to container 30, the conducting walls of pump 34, and a lead 124. Said means further comprises a power loop, which is completed when switch 108 is energized and which includes power supply 114, blade 102, the blade 126 of switch 128, a lead 130, the blade of switch 108, lead 110, clutch 94 and lead 112. Thus, if the processing composition that is being spread between superposed portions of films 16, 20 contacts brush 44, switch 108 is actuated and shaft 79 continues to rotate at high speed. When switch 108 is actuated, the remainder of switching circuit 100, now to be described, is rendered fully automatic.

The remainder of circuit 100 includes a combined means for deenergizing clutch 94, and for energizing clutch 96, to produce an intermediate rotational speed of output shaft 79. In the form shown, said combined means is responsive to the making of an electrical connection between second brush 42 and the thin layer of processing composition between superposed portions of films 16, 20. The aforementioned combined means comprises a control loop which includes power supply 116, blade 118, lead 120, the solenoid of switch 128, a lead 131, processing composition extending from brush 42 through pump 34 to container 30, the walls of pump 34, and lead 124. Said combined means further comprises a power loop, which is completed when switch 128 is actuated, and which includes power supply 114, blade 102, blade 126, a lead 132, the blade 134 of a switch 136, a lead 138, clutch 96 and lead 112. Thus, if the thin layer of processing composition between superposed portions of films 16, 20 has spread toward the edges of said films to such an extent that both brushes 42 and 44 are in contact with said thin layer, although switch 108 remains actuated, the actuation of switch 128 acts to energize clutch 96 and to deenergize clutch 94. By reason of the energization of clutch 96, gear 88 is locked to shaft 79 to produce an intermediate rotational speed of output shaft 79.

Circuit 100 further includes a combined means for deenergizing clutch 96 and for energizing clutch 98 in order to produce a low rotational speed of output shaft 79. In the form shown, said combined means is responsive to the making of an electrical connection between third brush 40 and the thin layer of processing composition spread between superposed portions of films 16, 20. The aforementioned combined means comprises a control loop which includes power supply 116, blade 118, lead 120, solenoid of switch 136, a lead 140, processing composition extending from brush 40 through pump 34 to container 30, the walls of pump 34, and lead 124. Said combined means further includes a power loop, which is completed when switch 136 is actuated, and which includes power supply 114, blade 102, blade 126, lead 132, blade 134, a lead 142, clutch 98 and lead 112. Thus, if the thin layer of processing composition between superposed portions of films 16, 20 has spread toward the edges of said films to such an extent that brushes 40, 42 and 44 are all in contact with said thin layer, only clutch 98 of clutches 94, 96 and 98 is energized. By reason of the energization of clutch 98, gear 90 is locked to shaft 79 to produce a low rotational speed of shaft 79.

In the operation of the illustrated photocopy camera, roll 14 is positioned on brackets 22 and roll 18 is positioned on brackets 24. First film 16 is drawn from roll 14 into the focal surface of lens 12 and into contact with pressure-applying member 26. Second film 20 is drawn from roll 18 and into contact with pressure-applying member 28. The first and second films thence are superposed between said pressure-applying members 26, 28, thus moving an exposed frame of first film 16 from exposure position into superposition with film 20. Coincidentally with the beginning of the superposition of said exposed frame and said second film, switch 104 is closed as a result of which an electrically controlled feeding of processing composition to the entrance between the pressure-applying members is initiated to form mass 29 of processing composition 30. When pump 34, transmission 66 and circuit 100 are properly adjusted, an adequate supply of processing composition for continuous development of a plurality of latent images on film 16 is assured and an oversupply of processing composition is prevented.

The invention herein disclosed is not limited to use in a camera or other photographic device which effects exposure of a photosensitive film but may be advantageously used in other devices wherein a controlled supply of processing composition is desirable for processing a previously exposed film. Examples of such devices are document copying apparatus, X-ray processing devices, etc.

Since certain changes may be made in the above product and apparatus without departing from the scope of the invention herein involved, it is intended that all matter contained in the above description or shown in the accompanying drawings shall be interpreted as illustrative and not in a limiting sense.

What is claimed is:

1. A photographic combination comprising a pair of pressure-applying rollers defining a pressure-applying region through which a photosensitive first film and a second film are adapted to advance from one side thereof to the opposite side thereof in superposed relation with a thin layer of processing composition between said first film and said second film, a container for a supply of processing composition, a nozzle adjacent to said pressure-applying region on said one side thereof, a gear pump for providing a flow of processing composition from said container through said nozzle to surfaces of said first film and said second film in order to form a mass from which processing composition is supplied to said thin layer, one of said films being provided with a plurality of rows of slots, each of said rows being at a different predetermined distance from an edge of said one of said films than any of the remainder of said rows, a plurality of brushes on the other side of said pressure-applying region, means for aligning said brushes with said rows whereby one each of said brushes is adapted to ride along one each of said rows in order to make electrical contact with a portion of said thin layer extending thereto, and a transmission driven in synchronism with said pressure-applying rollers the output speed of which determines the speed of said gear pump, said output speed being responsive to the making and breaking of an electrical path from said container, through said pump, said nozzle, said mass and said thin layer to at least one of said brushes.

2. The photographic combination of claim 1 wherein said means for aligning said brushes with said rows includes a guide following the aligned edges of said films, and a rod on said guide supporting said brushes.

3. Photographic apparatus comprising a pair of pressure-applying rollers defining a pressure-applying region through which a photosensitive first film and a second film are adapted to advance from one side thereof to the opposite side thereof in superposed relation with a thin layer of processing composition between said first film and said second film, a container for a supply of processing composition, a conduit for conducting said processing composition from said container to said pressure-applying region on one side thereof, a pump for directing a flow of processing composition from said container through said conduit to at least a surface of said first film and said second film in order to form a mass from which processing composition is supplied to said thin layer, one of said films being provided with a plurality of rows of slots, each of said rows being at a different predetermined distance from the edge of said one of said films than any of the remainder of said rows, a plurality of electrically conducting contacts on the other side of said pressure-applying region for riding along said rows in order to become electrically connected with any portion of said thin layer of processing composition extending thereto, the operation of said pump being dependent on the making and breaking of electrical connection between at least one of said contacts and said mass and being dependent on the rotational speed of said pressure-applying rollers.

4. A photographic apparatus comprising a pair of pressure-applying rollers defining a pressure-applying region through which a photosensitive first film and a second film are adapted to advance from one side thereof to the opposite side thereof in superposed relation with a thin layer of processing composition between said first film and said second film, a container for a supply of processing composition, a nozzle adjacent to said pressure-applying region on one side thereof, a pump for directing a flow of processing composition from said container through said nozzle to at least a surface of said first film and said second film in order to form a mass from which processing composition is supplied to said thin layer, one of said films being provided with a plurality of rows of slots, each of said rows being at a different predetermined distance from an edge of said one of said films than any of the remainder of said rows, a plurality of electrically conducting contacts on the other side of said pressure-applying region, means for aligning said contacts with said rows whereby one each of said contacts is adapted to ride along one each of said rows in order to make an electrical connection with a portion of said thin layer of processing composition extending thereto, the operation of said pump being dependent on the rotational speed of said pressure-applying rollers and on the making and breaking of the electrical path from said container through said pump, said nozzle, said mass and said thin layer to at least one of said contacts.

5. The photographic apparatus of claim 4 wherein said means for aligning said contacts with said rows includes a guide which follows the edges of said films when superposed and a rod on said guide supporting said contacts.

6. A photographic product comprising a base having a pair of opposed elongated edges, a coating on one side of said base capable of receiving a photographic image, said base and said coating being practically electrically nonconducting, said base and said coating being provided with a plurality of rows, each row of said plurality being adjacent to one of said pair of elongated edges and providing a plurality of elongated slots arranged in end-to-end relation and separated from each other by sections of said base, the added lengths of said slots constituting the major proportion of the length of said row, said rows being at different distances from the edges of said base to which they are respectively adjacent, and at least a water-permeable mask covering only the portions of said base provided with said plurality of rows.

7. The photographic product of claim 6 wherein said mask is a fabric.

8. Photographic apparatus comprising a pair of pressure-applying rollers defining a pressure-applying region through which a photosensitive first film and a second film are adapted to advance from one side thereof to the opposite side thereof in superposed relation with a thin layer of processing composition between said first film and said second film, a container for a supply of processing composition, a conduit for transmitting said processing composition from said container to said pressure-applying region on one side thereof, a pump for directing a flow of processing composition from said container through said conduit to at least a surface of said first film and said second film in order to form a mass from which processing composition is supplied to said thin layer, one of said films being provided with at least a row of slots, at least an electrically conducting contact on the other side of said pressure-applying region for riding along said row in order to make electrical contact with any portion of said thin layer of processing composition extending thereto, the operation of said pump being responsive to the making and breaking of electrical connection between said contact and said mass and being dependent on the rotational speed of said pressure-applying rollers.

References Cited in the file of this patent

UNITED STATES PATENTS

| | | |
|---|---|---|
| 727,283 | Cady | May 5, 1903 |
| 1,222,925 | Brewster | Apr. 17, 1917 |
| 1,399,200 | Edelman | Dec. 6, 1921 |
| 1,454,044 | Dodge | May 8, 1923 |
| 1,826,695 | Favour | Oct. 6, 1931 |
| 1,870,982 | Behr | Aug. 9, 1932 |
| 1,963,096 | Petit et al. | June 19, 1934 |
| 2,016,920 | Fisher | Oct. 8, 1935 |
| 2,123,227 | Bieling | July 12, 1938 |
| 2,419,853 | Pask | Apr. 29, 1947 |
| 2,424,052 | Pratt et al. | July 15, 1947 |
| 2,435,719 | Land | Feb. 10, 1948 |
| 2,500,422 | Land | Mar. 14, 1950 |
| 2,520,641 | Land | Aug. 29, 1950 |
| 2,543,181 | Land | Feb. 27, 1951 |
| 2,626,620 | Smith | Jan. 27, 1953 |